United States Patent [19]

Yoshino et al.

[11] 4,226,908

[45] Oct. 7, 1980

[54] WATER REPELLENT INORGANIC FOAM AND METHOD FOR PRODUCING THE SAME

[75] Inventors: Akira Yoshino, Yokohama; Isamu Iwami, Zushi; Tsuneo Wakabayashi, Yokohama, all of Japan

[73] Assignee: Asahi-Dow Limited, Tokyo, Japan

[21] Appl. No.: 858,296

[22] Filed: Dec. 7, 1977

[30] Foreign Application Priority Data

Jun. 20, 1977 [JP] Japan ............................... 52/73067
Sep. 20, 1977 [JP] Japan ............................... 52/112194

[51] Int. Cl.² .................. C04B 21/00; C07F 9/22; C07F 9/06; B32B 5/18
[52] U.S. Cl. ................................. 428/310; 252/62; 428/313; 428/314; 260/501.21; 260/551 P; 260/545 P; 260/933; 260/920; 260/439 R; 260/429 R; 260/448 R; 260/429.9; 106/40 R
[58] Field of Search ............... 260/963, 967, 502.4 R, 260/438.5 R, 583 R; 106/40 R; 252/62; 428/310

[56] References Cited

U.S. PATENT DOCUMENTS

| | | | |
|---|---|---|---|
| 2,953,479 | 9/1960 | Heyden | 260/438.5 |
| 3,148,996 | 9/1964 | Vukasovich et al. | 106/40 R |
| 3,223,537 | 12/1965 | Wiegert et al. | 106/40 R |
| 3,223,538 | 12/1965 | Wiegert et al. | 106/40 R |
| 3,261,696 | 7/1966 | Wiegert et al. | 106/40 R |
| 3,330,675 | 7/1967 | Magder | 106/40 R |
| 3,382,082 | 5/1968 | Eubanks | 106/40 R |
| 3,625,223 | 12/1971 | Sicka | 106/40 R |
| 3,762,935 | 10/1973 | Leach | 106/40 R |

*Primary Examiner*—Delbert E. Gantz
*Assistant Examiner*—Mark Bell
*Attorney, Agent, or Firm*—Armstrong, Nikaido, Marmelstein & Kubovcik

[57] ABSTRACT

A water repellent inorganic foam is prepared by foaming and setting a foamable composition comprising an aqueous metal phosphate in the presence of a specific compound having hydrophobic groups and functional groups reactive with said metal phosphate.

17 Claims, No Drawings

WATER REPELLENT INORGANIC FOAM AND METHOD FOR PRODUCING THE SAME

This invention relates to an inorganic foamed material having improved water resistance and a process for producing the same.

Organic foamed materials such as polyurethane foams, polystyrene foams or polyethylene foams have been known to have excellent thermal insulating properties and are useful for various materials such as construction materials, various lagging materials, etc. Among them, compositions for polyurethane foams are foamable and settable at normal temperature and very useful when structural fabrication is to be accomplished at the site at which the compositions are prepared. All of these materials, however, are inflammable since they are organic in nature and also have no satisfactory thermal resistance. In particular, damages caused by soot and toxic gases generated from organic materials at the time of fire are becoming great problems in recent years. In the field of thermal insulating materials, there have been made great efforts to make them non-flammable.

On the other hand, inorganic foams such as glass foams, light porous concrete and the like have also been developed as materials excellent in non-flammability and heat resistance. Inorganic foamed or porous materials of prior art have a common drawback that they have poor water resistance and are especially liable to absorb water or moisture. Thus, while they possess inherently good thermal insulating properties, they become frequently degraded in thermal insulating properties as the result of absorption of water or moisture when they are practically applied.

Improvement of water resistance has been proposed by incorporating a hydrophobic compound such as paraffin wax, mineral oil or silicon oil in an inorganic material such as cement or gypsum. The greatest drawback of this method is that it is extremely difficult to mix homogeneously the hydrophobic compound with the inorganic material. A mixture which appears to be homogeneously mixed by macroscopic observation may sometimes fail to be homogeneous from microscopic observation. Thus, the improvement of water resistance is quite limited. In particular, for porous or foamed materials having a structure which will readily absorb water, it is entirely impossible to improve water resistance thereof by such a method as described above.

The object of the present invention is to provide an inorganic foam improved in water resistance, having excellent water repellency, and a process for producing the same.

According to the present invention, there is provided an inorganic foam comprising metallic salt of phosphoric acid, wherein the improvement comprises imparting water repellency to said foam by incorporating in said foam hydrophobic groups chemically bonded to said salt, said hydrophobic groups being formed by reaction between said salt and a compound of the formula (I):

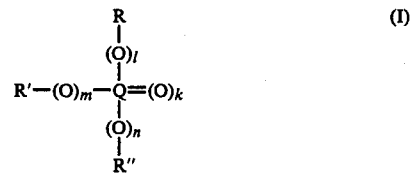

herein Q represents phosphorus or nitrogen and k, l, m and n integers of 0 or 1 and, when Q is phosphorus, (1) k is 0 or 1, l and m are 1, n is 0 or 1, R and R' are each hydrogen, and R" is an alkyl, an aryl, a substituted alkyl or a substituted aryl; or (2) k is 0 or 1, l is 1, m and n are each 0 or 1, R is hydrogen and R' and R" are each an alkyl, an aryl, a substituted alkyl or a substituted aryl, and when Q is nitrogen, k, l, m and n are 0, R, R' and R" are each hydrogen, an alkyl, an aryl, a substituted alkyl or a substituted aryl, with proviso that the case where R, R' and R" are all hydrogens is excluded.

Typical examples of the compounds of the formula (I) include the compounds as classified below:

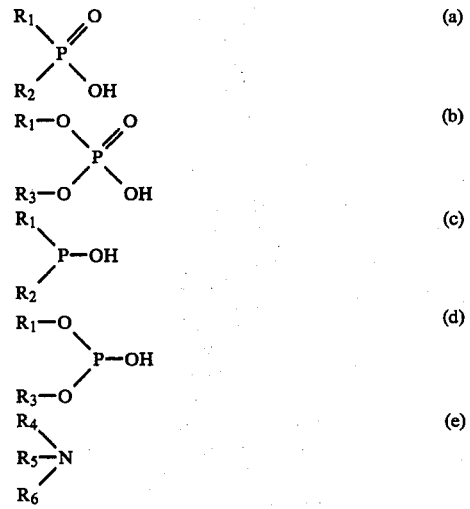

(wherein $R_1$ represents an alkyl, an aryl, a substituted alkyl, or a substituted aryl; $R_2$ hydroxy, an alkyl, an aryl, a substituted alkyl, or a substituted aryl; $R_3$ hydrogen, an alkyl, an aryl, a substituted alkyl, or a substituted aryl; and each of $R_4$, $R_5$ and $R_6$ represents hydrogen, an alkyl, an aryl, a substituted alkyl, or a substituted aryl excluding the case where all of $R_4$, $R_5$ and $R_6$ are hydrogens).

The water resistance exhibited by the inorganic foam of the present invention is effected by homogeneous dispersion of the compound of the general formula (I) which has in combination hydrophobic groups and functional groups reactive with the metal phosphate, as substantially different from the method of prior art. The effect of addition of such a compound can be achieved by an extremely small amount thereof and such an effect remains almost permanently since the compound is chemically bonded to the inorganic material. It is therefore critical that the compound of the formula (I) should contain hydrophobic groups together with functional groups which are reactive with the metal phosphate. A compound having only hydrophobic groups will not give the excellent result of the present invention. The hydrophobic groups herein mentioned include alkyl groups, aryl groups, substituted alkyl groups and substituted aryl groups. Other groups such as alkyl silyl groups

may also be included. The functional groups reactive with the metal phosphate are amino groups which can be chemically bound by neutralization reaction with phosphoric acid groups in the metal phosphate, or phosphoric hydroxide groups which can be chemically bound by neutralization or exchange reaction with metallic ions in the metal phosphate. Typical examples of the compounds as represented by the general formula (I) are organic amines such as mono-(or di- or tri-)butyl amine, mono-(or di- or tri-)hexyl amine, mono- (or di- or tri-)octyl amine, mono-(or di- or tri-)lauryl amine, mono-(or di- or tri-)palmityl amine, aniline, or myristyl phenyl amine, etc.; organic phosphoric acids such as mono- (or di-)phenyl phorphoric acid or mono-(or di-)phenyl phorphoric acid, etc.; phosphoric acid esters such as phosphoric acid mono-(or di-)butyl ester, phosphoric acid mono-(or di-)oleyl ester, etc.; organic phosphorous acids such as mono-(or di-)stearyl phosphorous acid, mono-(or di-) dodecylphenyl phosphorous acid, etc.; and phosphorous acid esters such as phosphorous acid (octyl) (dodecyl) ester, phosphorous acid (butyl) (nonylphenyl) ester, phosphorous acid stearyl ester, etc.

The inorganic foam of the present invention can be prepared by foaming and setting a composition comprising metallic salts of phosphoric acid in the presence of a compound of the formula (I) as described above. Foaming is generally conducted by use of a chemical foaming agent such as metal carbonates, metallic powders, hydrogen peroxide, etc. and other liquid foaming agents having low boiling points such as Freon.

Foaming and setting of the foamable composition may be conducted by any of the known methods. Foamed products with a relatively low expansion ratio can be obtained by the methods as disclosed by U.S. Pat. No. 3,330,675 and U.S. Pat. No. 3,148,996. The subject matters of these Patents are herein incorporated by way of reference.

According to a preferred embodiment of the process of the present invention, a highly expanded inorganic foam with specific gravity of 0.15 or less can be produced by using a specific metal phosphate (A) wherein the ratio of the total number of metallic atoms in said metal phosphate (M/P ratio) is from $\frac{1}{2}$ to 3/2 and the equivalent ratio of the total valences of the metallic atoms to the total valences of phosphate ions in said metal phosphate (E ratio) from $\frac{1}{3}$ to $\frac{3}{4}$ and adding the polyvalent metal carbonate (B) in an amount which is controlled within the range such that the ratio of the total number of metallic atoms to the number of phosphorus atoms in the resultant foam may be from $\frac{3}{8}$ to 2/1 and the equivalent ratio of the total valences of the metallic atoms to the total valences of phosphate ions in said resultant foam may be from 0.65 to 0.95. The particulars of this embodiment are described in co-pending U.S. Patent Application filed on even date herewith. The subject matter of this Application is also herein incorporated by way of reference.

By practice of this embodiment in the presence of a compound (I) as described above, there can be obtained a water repellent inorganic foam comprising metallic salts of phosphoric acid having a structure of three-dimentional ionically crosslinked networks, being characterized in that (a) the ratio of the total number of metal atoms constituting said salts to that of phosphorus atoms is in the range from $\frac{3}{8}$ to 2/1;

(b) the metals constituting said salts comprises polyvalent metals optionally incorporated with mono-valent metals and have a composition such that the equivalent ratio of the total valences of metals relative to the total valences of phosphate ion is from 0.65 to 0.95;

(c) said foam contains discrete cells with average diameter of 3 mm or less; and (d) said foam has a specific gravity of 0.15 or less.

A preferable foamable composition to be used in the present invention comprises (1) a metal phosphate containing at least one polyvalent metal which may optionally be modified with oxides, hydroxides or silicates of mono- or poly-valent metals, (2) a polyvalent metal carbonate and (3) water, the amount of said carbonate (2) being from 5 to 50 parts by weight and that of water (3) from 20 to 200 parts by weight, based on 100 parts by weight of the metal phosphate (A).

Typical examples of the metal phosphate to be used in the present invention are primary polyvalent metal phosphates, e.g. primary magnesium phosphate, primary calcium phosphate, primary strontium phosphate, primary barium phosphate, primary zinc phosphate, primary aluminum phosphate, etc. and a mixture of said primary polyvalent metal phosphate with a secondary phosphate, tertiary phosphate or pyrophosphate of such metals as magnesium, calcium, strontium, barium, aluminum, zinc, iron, manganese, etc. These polyvalent metal phosphates may optionally be modified with oxides, hydroxides or silicates or mono- or polyvalent metals such as alkali metals (e.g. lithium, sodium, potassium), magnesium, calcium, strontium, barium, aluminum, zinc, iron, manganese, etc. Of course, the above phosphates can be obtained directly from the reaction between an aqueous phosphoric acid solution and oxides, hydroxides or salts of said metals.

The polyvalent metal carbonates to be used in the present invention are exemplified by magnesium carbonate, calcium carbonate, strontium carbonate, barium carbonate, zinc carbonate, iron carbonate, cobalt carbonate, zirconium carbonate, basic magnesium carbonate, basic cobalt carbonate and the like. The carbonates to be used in the present invention are preferably those of a metal having valence of two or more in order that they can function simultaneously as a foaming agent which generates carbon dioxide by reaction with the aforesaid phosphate and as a hardening agent for setting said phosphate.

The compound represented by the above formula (I) is used in an amount of 0.01 to 10 parts by weight, preferably from 0.1 to 5 parts by weight, based on 100 parts by weight of the metal phosphate. With an amount less than 0.01 parts by weight, no significant effect can be obtained. On the contrary, an amount in excess of 10 parts by weight will make homogeneous mixing or reaction impossible and may, in an extreme case, damages the inherent properties such as excellent thermal insulating properties or non-flammability.

The compound of the formula (I) may be added at any time during the preparation of the foamed product as described above. For example, it may be present in the original aqueous metal phosphate solution or dispersion or alternatively it may be added by mixing with the carbonate which is to be added to said aqueous metal phosphate solution or dispersion.

As mentioned above, the excellent effect of the present invention can be imparted by use of a compound having hydrophobic groups in combination with functional groups reactive with the metal phosphate. Thus, the hydrophobic compounds having reactivity with the metal phosphate such as alcohols, epoxy compounds, weak acid salts of amines and the like may also be available to form in situ the compound of the formula (I) to achieve the effect of the present invention.

The inorganic foam of the present invention may further contain aggregates, reinforcing materials or fillers to improve mechanical strength thereof, if desired. What is important here is that cell shape as well as cell size of the foamed product obtained is greatly influenced by use of such a reinforcing material. In particular, physical properties such as thermal insulating property may frequently be deteriorated and there should be paid due consideration as to the selection of the reinforcing material to be used and its quantity. The reinforcing materials which may be used in the present invention include fibrous reinforcing materials such as glass fibers, asbestos fibers, rock wool fibers, fibrous calcium silicate, cellulose fibers, synthetic fibers (e.g. polyester, polyamide, etc.) and others; and powdery reinforcing materials such as fly ash, talc, kaolinite, zircon sand, alumina, silica, pearlite and others. The quantity of the reinforcing material to be used in the present invention is desired to fall within the range from 1 to 1000 parts by weight based on 100 parts by weight of the aforesaid phosphate. Particularly, fibrous reinforcing materials may have an extremely bad influence on the state of foaming when they are employed in excessive amount, although they can remarkably improve the strength of the foam on the other hand. Hence, they should be used in amounts from 1 to 25 parts by weight. In contrast, powdery reinforcing materials do not improve the strength of the foam to a remarkable extent by addition of a small amount thereof, but have no bad influence on the resultant foam when the amount is increased. Hence, they are desired to be used in amounts from 10 to 1000 parts by weight. It is not preferred to use an amount of the reinforcing material in excess of 1000 parts by weight, because workability is poor and the foams obtained are insofar in expansion ratio and thermal conductivity. It should further be noted that the upper limit of the reinforcing material is further limited when it contains metallic species having reactivity with the metal phosphate of the present invention.

As mentioned above, by use of the preferred composition according to the present invention, there can be obtained water repellent inorganic foams with various complicated shapes at normal temperature and under normal pressure. Further, they are very useful since they are excellent in non-flammability, thermal insulating properties, heat resistance and also water resistance as well as mechanical strength.

The particular feature of the present invention can further be exhibited by making into a composite with other materials. As mentioned above, the preferred composition of the present invention is foamable under conditions of normal temperature and pressure and therefore there can simply be obtained a composite by casting the composition into the space between other materials and allowing it to expand and set. Thus, by casting the composition into a space defined between other materials having various complicated structures, including not only plane structure but also other structures such as curved structure or honeycomb structure and permitting said composition to foam and set, there can be obtained composite materials with light weight and excellent thermal insulating property which can be utilized for various uses. Furthermore, in practicing the present invention, it is not required to use a large scale equipment and therefore the preferred composition of the present invention is useful for thermal insulating material for heat reservoir, thermal insulating material for ship or fire-retardant thermal insulating material for steel-frame, for which structural fabrication is desired to be accomplished at the site where the composition is prepared.

Other materials as mentioned above to be used in combination with the present composition may include metals, glasses, cement products, gypsum products, plastic materials, woods, papers, cloths and others. The inorganic foam shows excellent adhesiveness with these other materials.

The present invention is illustrated in further detail by the following Examples, in which all parts and "%" are by weight and thermal conductivity is measured by the method according to ASTM-C 518. The test methods for evaluation of water resistance are explained below:

(1) Measurement of water absorption:

A test block of 5 cm×5 cm ×5 cm is cut from the sample and, after measurement of its weight and apparent volume, dipped into water at 25° C. for 3 hours, followed by weighing again of the block. The amount of water absorbed is measured per 100 cm$^3$ of the test block by the following equation:

$$\text{Water absorption (g/100 cm}^3\text{)} = \frac{\text{Weight after absorption(g)} - \text{Weight before absorption(g)}}{\text{Apparent volume of test block before absorption (cm}^3\text{)}} \times 100$$

(2) Red ink penetration test:

A test block of 3 cm×3 cm×6 cm is cut from the sample, dipped in commercially available aqueous red ink for 12 hours and thereafter the block is cut to observe cross-section of the test to examine penetration of red ink into the test block.

EXAMPLE 1

| | |
|---|---|
| Phosphoric acid (75% aqueous solution) | 80 parts |
| Aluminum hydroxide | 15 parts |
| Zinc oxide | 25 parts |
| Phosphoric acid monolauryl ester | 0.5 part |

The above components are completely mixed and reacted at normal temperature to obtain a transparent viscous solution with M/P ratio=0.79, E=0.66. When this solution is mixed with 20 parts of basic magnesium carbonate, foaming immediately begins and after 10 minutes foaming is substantially completed to give the foam (M/P=1.13, E=0.87) having the properties as shown in Table 1.

TABLE 1

| Density (g/cm³) | Thermal conductivity (kcal/m · hr · °C.) | Compressive strength (kg/cm²) | Water resistance Water absorption (g/100 cm³) | Water resistance Red ink penetration |
|---|---|---|---|---|
| 0.08 | 0.035 | 0.5 | 1.5 | no penetration |

EXAMPLES 2–7

Comparative Examples 1–7

Example 1 is repeated except that various compounds as shown in Table 2 are used in place of phosphoric acid monolauryl ester. The results of evaluation of these foams are set forth in Table 3.

TABLE 2

| | Example 2 | Example 3 | Example 4 | Example 5 | Example 6 | Example 7 |
|---|---|---|---|---|---|---|
| Name of compound: | Phosphoric acid dibutyl ester | Phosphorous acid monostearyl ester | Diphenyl phosphoric acid | Mono-octyl phosphorous acid | Lauryl amine | Dimethyl octyl amine |
| Chemical formula: | $C_4H_9-O-\overset{\overset{H}{\|}}{\underset{\underset{O-C_4H_9}{\|}}{P}}=O$ | $HO-\overset{\overset{H}{\|}}{\underset{\underset{O-C_{18}H_{37}}{\|}}{P}}$ | $C_6H_5-\overset{\overset{H}{\|}}{\underset{\underset{C_6H_5}{\|}}{P}}=O$ | $HO-\overset{\overset{H}{\|}}{\underset{\underset{C_8H_{17}}{\|}}{P}}$ | $C_{12}H_{25}-\overset{\overset{H}{\|}}{\underset{\underset{H}{\|}}{N}}$ | $C_8H_{17}-\overset{\overset{CH_3}{\|}}{\underset{\underset{CH_3}{\|}}{N}}$ |

| | Comparative example 1 | Comparative example 2 | Comparative example 3 | Comparative example 4 | Comparative example 5 | Comparative example 6 | Comparative example 7 |
|---|---|---|---|---|---|---|---|
| Name of compound: | Stearic acid | Dodecyl sodium sulfate | Dodecyl benzene sodium sulfonic acid | Solid paraffin | Phosphoric acid triphenyl ester | Phosphorous acid tributyl ester | No addition |
| Chemical formula: | $C_{17}H_{35}-\overset{\overset{OH}{\|}}{C}=O$ | $C_{12}H_{25}-O-\overset{\overset{ONa}{\|}}{\underset{\underset{O}{\|}}{S}}=O$ | (C₆H₄(ONa)(SO₂)—C₁₂H₂₅) | $C_mH_n$ | $C_6H_5O-\overset{\overset{O-C_6H_5}{\|}}{\underset{\underset{O-C_6H_5}{\|}}{P}}=O$ | $C_4H_9-O-\overset{\overset{O-C_4H_9}{\|}}{\underset{\underset{O-C_4H_9}{\|}}{P}}$ | — |

TABLE 3

| | Evaluation of water resistance | |
|---|---|---|
| | Water absorption (g/100 cm³) | Red ink penetration |
| Example 2 | 4.1 | No penetration |
| Example 3 | 1.1 | No penetration |
| Example 4 | 3.7 | No penetration |
| Example 5 | 1.3 | No penetration |
| Example 6 | 3.8 | No penetration |
| Example 7 | 2.9 | No penetration |
| Comparative example 1 | 30.1 | Penetration |
| Comparative example 2 | 34.6 | Penetration |
| Comparative example 3 | 36.1 | Penetration |
| Comparative example 4 | 31.9 | Penetration |
| Comparative example 5 | 32.6 | Penetration |
| Comparative example 6 | 30.9 | Penetration |
| Comparative example 7 | 32.3 | Penetration |

EXAMPLE 8

A test strip of 3 cm×3 cm×6 cm is cut from the foam obtained in Example 1 and placed in a Soxhlet extracting vessel and extracted with 200 ml of isopropyl alcohol for 24 hours. The test strip is dried after extraction and its water resistance is evaluated to give the result as shown in Table 4.

TABLE 4

| | Water absorption (g/100 cm³) | Red ink penetration | Remarks |
|---|---|---|---|
| Example 8 | 1.6 | No penetration | After extraction |
| Example 1 | 1.5 | No penetration | Before extraction |

EXAMPLES 9–11

Comparative Examples 8–9

| | |
|---|---|
| Primary aluminum phosphate (50% aqueous solution) | 160 parts |
| Magnesium oxide | 15 parts |
| Zinc silicate | 5 parts |

The above components are mixed and reacted thoroughly to prepare a transparent and viscous solution with M/P ratio=0.87, E=0.68. Several tests are conducted by adding various amounts of phosphoric acid distearyl ester as shown in Table 5, followed by complete dispersing in said solution, and adding 25 parts of calcium carbonate to perform foaming and setting. Each foam has M/P ratio of 1.20 and E ratio of 0.90.

TABLE 5

| | Comparative example 8 | Example 9 | Example 10 | Example 11 | Comparative example 9 |
|---|---|---|---|---|---|
| Phosphoric acid distearyl ester (parts) | 0.005 | 0.05 | 0.1 | 5.0 | 15.0 |

The foams obtained are evaluated for water resistance and also for heat resistance by heating at 800° C. for 10 minutes to give the results as shown in Table 6.

TABLE 6

| | Water resistance evaluation | | |
|---|---|---|---|
| | Water absorption (g/100 cm³) | Red ink penetration | Heat resistance |
| Comparative example 8 | 25.0 | Penetration | Nothing abnormal |
| Example 9 | 2.1 | No penetration | Nothing abnormal |
| Example 10 | 1.4 | No penetration | Nothing abnormal |
| Example 11 | 1.0 | No penetration | Nothing abnormal |
| Comparative example 9 | 0.8 | No penetration | Soot and bad odor generated |

EXAMPLE 12

| | |
|---|---|
| Phosphoric acid (75% aqueous solution) | 80 parts |
| Aluminum hydroxide | 15 parts |
| Magnesium oxide | 10 parts |
| Zinc oxide | 15 parts |
| Octyl amine | 1.0 part |

The above components are completely mixed and reacted at normal temperature to obtain a semi-transparent viscous solution with M/P ratio=1.0, E=0.79. After 3.0 parts of paper pulps are added to this solution and completely dispersed, the mixture is mixed with 10 parts of calcium carbonate and cast into the space between two aluminum plates of 300 mm×300 mm×1 mm to prepare a sandwitch composite with thickness of 50 mm. The foam (M/P=1.18, E=0.90) is strongly adhered to aluminum plates and a part of the foam is cut out for measurement of its density, thermal conductivity, water resistance and compressive strength to give the results set forth in Table 7.

TABLE 7

| Density (g/cm³) | Thermal conductivity (kcal/m · hr. °C.) | Red ink penetration | Compressive strength (kg/cm²) |
|---|---|---|---|
| 0.11 | 0.041 | No penetration | 2.5 |

EXAMPLE 13

| | |
|---|---|
| Primary aluminum phosphate (50% aqueous solution) | 100 parts |
| Calcium silicate powders | 75 parts |
| Cationic surfactant (Cation BB; Nihon Yushi Co., Japan) | 2.0 parts |
| Dioctyl phosphate | 2.0 parts |

The above components (M/P=1.60, E=1.13) are mixed and stirred to effect foaming and left to stand. The foamed mixture is completely set within 30 minutes to obtain a foam with specific gravity of 0.65. This foam has a water absorption of 1.8 g/100 cm³ and no penetration of red ink into the foam is observed.

What we claim is:

1. In an inorganic foamed article comprising a metallic salt of phosphoric acid, the improvement which comprises imparting water repellency to said article by chemically bonding hydrophobic groups to said salt, said hydrophobic groups being formed during preparation of the article by a reaction between said salt and a compound of the formula (I):

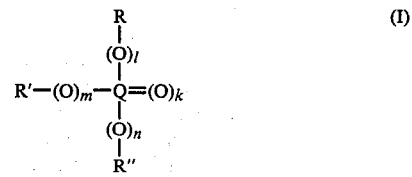

wherein Q represents phosphorus or nitrogen and k, l, m and n are integers of 0 or 1 and, when Q is phosphorus, (1) k is 0 or 1, l and m are 1, n is 0 or 1, R and R' are hydrogen atoms, and R'' is an alkyl, an aryl, a substituted alkyl or a substituted aryl; or (2) k is 0 or 1, l is 1, m and n are each 0 or 1, R is hydrogen and R' and R'' are each an alkyl, an aryl, a substituted alkyl or a substituted aryl, and when Q is nitrogen, k, l, m and n are 0, R, R' and R'' are each hydrogen, an alkyl, an aryl, a substituted alkyl or a substituted aryl, with the proviso that the case where R, R' and R'' are all hydrogen is excluded.

2. An inorganic foam as in claim 1, wherein the phosphoric acid salt contains at least one polyvalent metal selected from the group consisting of di-valent and tri-valent metals.

3. An inorganic foam as in claim 2, wherein the polyvalent metal contains at least one of magnesium, zinc and aluminum.

4. An inorganic foam as in claim 1, wherein the phosphoric acid salt further contains at least one alkali metal.

5. An inorganic foam as in claim 1, wherein the composition further contains an additive selected from the group consisting of aggregates, reinforcing materials and fillers.

6. A process for producing a water repellent inorganic foam which comprises foaming a foamable composition comprising metallic salts of phosphoric acid in the presence of a compound of the formula (I):

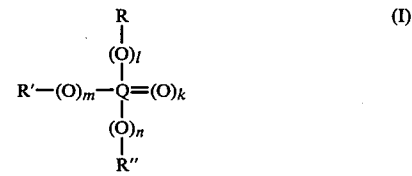

(wherein Q represents phosphorus or nitrogen and k, l, m and n integers of 0 or 1 and, when Q is phosphorus, (1) k is 0 or 1, l and m are 1, n is 0 or 1, R and R' are each hydrogen and R'' is an alkyl, an aryl, a substituted alkyl or a substituted aryl; or (2) k is 0 or 1, l is 1, m and n are each 0 or 1, R is hydrogen and R' and R'' are each an alkyl, an aryl, a substituted alkyl or a substituted aryl, and when Q is nitrogen, k, l, m and n are 0, R, R' and R'' are each hydrogen, and alkyl, an aryl, a substituted alkyl or a substituted aryl, with proviso that the case where R, R' and R'' are all hydrogens is excluded) in an amount of 0.01 to 10 parts by weight based on 100 parts by weight of the metallic salts of phosphoric acid.

7. A process as in claim 6, wherein the formable composition comprises 100 parts by weight of a metal phosphate containing at least one polyvalent metal, 5 to 50 parts by weight of a polyvalent metal carbonate and from 20 to 200 parts by weight of water.

8. A process as in claim 7, wherein the polyvalent metal is at least one selected from the group consisting of di-valent and tri-valent metals.

9. A process as in claim 8, wherein the polyvalent metal is at least one of magnesium, zinc and aluminum.

10. A process as in claim 7, wherein the metal phosphate further contains at least one alkali metal.

11. A process as in claim 7, wherein the metal phosphate is modified with oxides, hydroxides or silicates of mono- or poly-valent metals.

12. A process as in claim 6, wherein the composition further contains an additive selected from the group consisting of aggregates, reinforcing materials and fillers.

13. A process as in claim 7, wherein the polyvalent metal carbonate is selected from the group consisting of magnesium carbonate, calcium carbonate, strontium carbonate, barium carbonate, zinc carbonate, iron carbonate, cobalt carbonate, basic magnesium carbonate, basic zinc carbonate and basic cobalt carbonate.

14. A shaped article comprising the inorganic foam as claimed in claim 1.

15. A shaped article according to claim 14, having the inorganic foam supported on or contained in a shaped article made of other materials.

16. A shaped article as in claim 14, wherein the inorganic foam is shaped in a sheet or a block.

17. A shaped article as in claim 15, wherein the inorganic foam is sandwiched between sheets of other materials.

* * * * *